United States Patent
Zhang et al.

(10) Patent No.: US 10,519,845 B2
(45) Date of Patent: Dec. 31, 2019

(54) WRAPPABLE MULTI-LAYER HEAT SHIELD

(71) Applicant: Federal-Mogul Powertrain, Inc., Southfield, MI (US)

(72) Inventors: Zhong Huai Zhang, Pottstown, PA (US); Tianqi Gao, Exton, PA (US); Linwood Ludy, Pottstown, PA (US); Daniel Rowcotsky, Dresher, PA (US); Wai Kit Ho, Exton, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 472 days.

(21) Appl. No.: 14/468,858

(22) Filed: Aug. 26, 2014

(65) Prior Publication Data
US 2015/0056881 A1  Feb. 26, 2015

Related U.S. Application Data
(60) Provisional application No. 61/869,859, filed on Aug. 26, 2013.

(51) Int. Cl.
  *F01N 13/16* (2010.01)
  *F01N 13/18* (2010.01)
  (Continued)

(52) U.S. Cl.
  CPC .............. *F01N 13/148* (2013.01); *B32B 1/00* (2013.01); *B32B 1/04* (2013.01); *B32B 1/08* (2013.01); *B32B 3/00* (2013.01); *B32B 3/02* (2013.01); *B32B 3/04* (2013.01); *B32B 3/06* (2013.01); *B32B 5/00* (2013.01); *B32B 5/02* (2013.01); *B32B 5/022* (2013.01); *B32B 5/024* (2013.01);
  (Continued)

(58) Field of Classification Search
  None
  See application file for complete search history.

(56) References Cited

U.S. PATENT DOCUMENTS

| | | | |
|---|---|---|---|
| 4,656,712 A | | 4/1987 | Harwood et al. |
| 4,808,465 A | * | 2/1989 | Vane ..................... B29C 70/088 |
| | | | 181/288 |

(Continued)

FOREIGN PATENT DOCUMENTS

| | | | |
|---|---|---|---|
| DE | 10107054 | * | 8/2002 |
| JP | S3732281 Y | | 12/1962 |

(Continued)

OTHER PUBLICATIONS

Wikipedia, https://en.wikipedia.org/wiki/Nonwoven_fabric, page visited on Dec. 18, 2018 (Year: 2018).*

(Continued)

*Primary Examiner* — Shawn Mckinnon
(74) *Attorney, Agent, or Firm* — Robert L. Stearns; Dickinson Wright, PLLC

(57) ABSTRACT

A flexible, wrappable multilayered heat shield is provided. The heat shield includes a reflective metal outermost layer, an innermost layer of high temperature yarn capable of withstanding temperatures up to about 650 degrees ° C. continuously, and about 750° C. intermittently, and an intermediate layer of nonwoven material capable of withstanding temperatures up to about 550° C. continuously sandwiched between the outermost and innermost layers.

9 Claims, 1 Drawing Sheet

(51) Int. Cl.
| | | |
|---|---|---|
| *D04C 1/06* | (2006.01) | |
| *F01N 13/14* | (2010.01) | |
| *F01N 3/20* | (2006.01) | |
| *B32B 5/00* | (2006.01) | |
| *B32B 5/02* | (2006.01) | |
| *B32B 5/04* | (2006.01) | |
| *B32B 5/10* | (2006.01) | |
| *B32B 5/12* | (2006.01) | |
| *B32B 5/22* | (2006.01) | |
| *B32B 5/26* | (2006.01) | |
| *B32B 7/00* | (2019.01) | |
| *B32B 7/02* | (2019.01) | |
| *B32B 7/10* | (2006.01) | |
| *B32B 9/00* | (2006.01) | |
| *B32B 15/00* | (2006.01) | |
| *B32B 15/01* | (2006.01) | |
| *B32B 15/04* | (2006.01) | |
| *B32B 15/14* | (2006.01) | |
| *B32B 15/18* | (2006.01) | |
| *B32B 15/20* | (2006.01) | |
| *B32B 19/04* | (2006.01) | |
| *B32B 19/06* | (2006.01) | |
| *B32B 1/00* | (2006.01) | |
| *B32B 1/04* | (2006.01) | |
| *B32B 1/08* | (2006.01) | |
| *B32B 3/00* | (2006.01) | |
| *B32B 3/02* | (2006.01) | |
| *B32B 3/04* | (2006.01) | |
| *B32B 3/06* | (2006.01) | |
| *F02B 77/11* | (2006.01) | |

(52) U.S. Cl.
CPC ............... *B32B 5/026* (2013.01); *B32B 5/04* (2013.01); *B32B 5/10* (2013.01); *B32B 5/12* (2013.01); *B32B 5/22* (2013.01); *B32B 5/26* (2013.01); *B32B 7/00* (2013.01); *B32B 7/02* (2013.01); *B32B 7/10* (2013.01); *B32B 9/00* (2013.01); *B32B 9/005* (2013.01); *B32B 15/00* (2013.01); *B32B 15/017* (2013.01); *B32B 15/04* (2013.01); *B32B 15/14* (2013.01); *B32B 15/18* (2013.01); *B32B 15/20* (2013.01); *B32B 19/04* (2013.01); *B32B 19/06* (2013.01); *D04C 1/06* (2013.01); *F01N 3/2066* (2013.01); *F01N 13/16* (2013.01); *F01N 13/18* (2013.01); *F02B 77/11* (2013.01); *Y10T 442/3707* (2015.04); *Y10T 442/475* (2015.04); *Y10T 442/488* (2015.04); *Y10T 442/494* (2015.04); *Y10T 442/60* (2015.04); *Y10T 442/656* (2015.04)

(56) References Cited

U.S. PATENT DOCUMENTS

| | | | |
|---|---|---|---|
| 5,030,518 A | 7/1991 | Keller | |
| 6,465,110 B1 | 10/2002 | Boss et al. | |
| 6,610,928 B2 | 8/2003 | Synder | |
| 6,974,634 B2 | 12/2005 | Cless et al. | |
| 7,152,633 B2 | 12/2006 | White | |
| 2006/0070598 A1 | 4/2006 | Marks et al. | |
| 2006/0228967 A1* | 10/2006 | Gladfelter | B32B 3/18 442/228 |
| 2007/0166495 A1* | 7/2007 | Sellis | B32B 5/26 428/36.1 |
| 2008/0169038 A1 | 7/2008 | Sellis et al. | |
| 2010/0089515 A1 | 4/2010 | Malloy et al. | |
| 2011/0162126 A1 | 7/2011 | Zhang et al. | |
| 2014/0050886 A1* | 2/2014 | Burgin | B32B 5/18 428/138 |

FOREIGN PATENT DOCUMENTS

| | | |
|---|---|---|
| JP | 2006514509 A | 5/2008 |
| JP | 2008535710 A | 9/2008 |
| JP | 2009529100 A | 8/2009 |
| JP | 2010515859 A | 5/2010 |
| JP | 2012502196 A | 1/2012 |
| JP | 2012533693 A | 12/2012 |
| JP | 2014514185 A | 6/2014 |
| WO | 2010028201 A2 | 3/2010 |
| WO | 2011009112 A2 | 1/2011 |
| WO | WO2012126763 * | 9/2012 |

OTHER PUBLICATIONS

Machine translation of DE10107054, Funke (Year: 2002).*
International Search Report dated Oct. 28, 2014 (PCT/US2014/052707).

* cited by examiner

WRAPPABLE MULTI-LAYER HEAT SHIELD

CROSS-REFERENCE TO RELATED APPLICATION

This application claims the benefit of U.S. Provisional application Ser. No. 61/869,859, filed Aug. 26, 2013, which is incorporated herein by reference in its entirety.

BACKGROUND OF THE INVENTION

1. Technical Field

This invention relates generally to thermal heat shields, and more particularly to wrappable multilayer thermal heat shields.

2. Related Art

Standards for vehicle emissions are becoming increasing strict in reducing the emission of nitrogen oxide and carbon monoxide. In order to facilitate reducing the emission of these gases, many vehicle applications include selective catalytic reduction (SCR) applications, for example. SCR applications typically incorporate conduits for injecting ammonia or urea solutions into the exhaust pipe upstream of a catalytic converter. The injected solution evaporates and mixes with the exhaust gases to create a chemical reaction that will reduce nitrogen oxide and carbon monoxide emissions, and instead produce nitrogen and water. However, in order for the SCR applications to perform efficiently, it is necessary for the exhaust gases that mix with the injected solution to remain at a maximum high temperature; otherwise, the intended chemical conversion of the nitrogen oxide and carbon monoxide gases is adversely affected and inefficient, thereby resulting in unwanted emissions thereof. Accordingly, it is desirable and important to maintain the exhaust gases along the exhaust system upstream and within the SCR system at a maximum temperature.

SUMMARY OF THE INVENTION

In accordance with one aspect of the invention, a flexible, wrappable multilayered heat shield is provided. The heat shield includes a reflective outermost layer, an innermost layer of high temperature yarn, and an intermediate layer of nonwoven material sandwiched between the outermost and innermost layers. As such, the heat shield is composed of at least three different layers that protect one another in a way that allows each layer to function separately, as intended, and to further function together to provide a synergistic result that allows the heat shield, as a whole, to function as intended.

The heat shield is particularly useful as an exhaust system heat shield to facilitate optimal performance of a selective catalytic reduction system (SCR) within the exhaust system by minimizing the thermal losses of the high temperature exhaust gases flowing within the exhaust system. Accordingly, exhaust gases flowing throughout the SCR system of the exhaust system are maintained, by the heat shield, at a maximum temperature within the SCR system, with minimal temperature drop of the exhaust gases from that as first emitted from the engine. As such, an optimal chemical conversion of nitrogen oxide and carbon monoxide within the exhaust gases into nitrogen and water is achieved by the SCR system.

The innermost, outermost and intermediate layers of the heat shield can be fixed to one another using a variety of mechanisms, including high temperature adhesives, sewing, and mechanical fasteners, by way of example and without limitation.

The heat shield, given it is formed as a generally flat lamination, can be sized and shaped for subsequent wrapping, as desired, such as via die cutting, for example.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
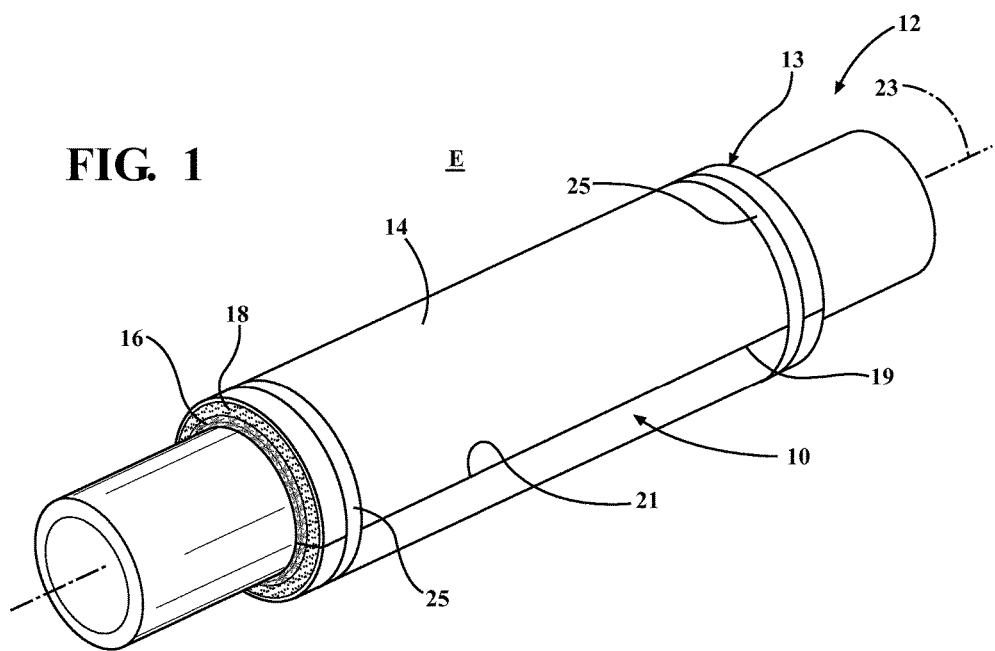
FIG. 1 is a partial perspective view of an exhaust system having a multi-layered exhaust system heat shield constructed in accordance with one aspect of the invention.
Figure 2:
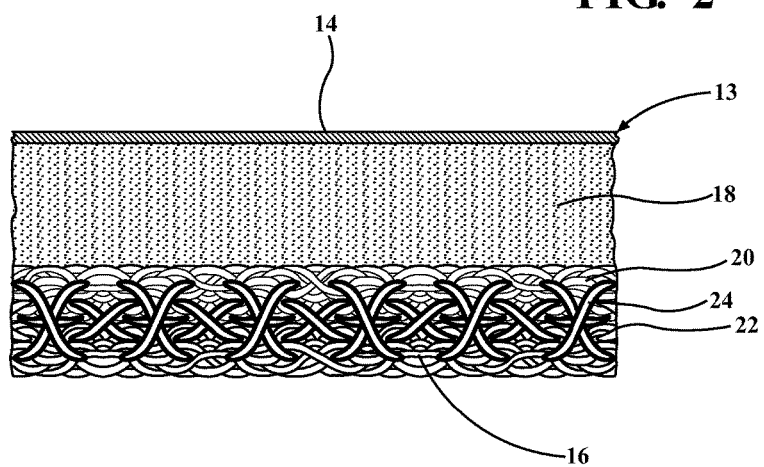
FIG. 2 is a partial side view of the multi-layered exhaust system heat shield of FIG. 1.

Referring in more detail to the drawings, FIG. 1 illustrates a wrappable, flexible multi-layered heat shield, referred to hereafter as heat shield 10, constructed in accordance with one aspect of the invention that provides desired shielding against thermal and other environment effects, such as to a shielded portion of an exhaust system, represented generally at 12, by way of example and without limitation. The heat shield 10 provides multiple shielding benefits, including, but not limited to, preventing the radiation of the high temperature exhaust gases within the exhaust system 12 to the outside ambient environment E, thus, preventing thermal losses of the high temperature exhaust gases; preventing thermal effects in the outside ambient environment E from reducing the temperature of the high temperature exhaust gases within the exhaust system, including external convection on the exhaust system, and further, preventing outside environment elements, such as fluids, from impacting or otherwise reaching and reducing the temperature exhaust gases within the shielded portion of the exhaust system 12. As such, by providing the desired shielding against thermal losses from the exhaust system 12, a selective catalytic reduction system within the exhaust system 12 can effectively convert high temperature exhaust gases, such as nitrogen oxide and carbon monoxide into nitrogen and water, as intended, to prevent the nitrogen oxide and carbon monoxide from reaching the environment. The heat shield 10 has a wrappable wall 13 that includes an outermost layer 14, an innermost layer 16, and an intermediate layer 18 sandwiched directly between the outermost and innermost layers 14, 16 and in contact therewith. Accordingly, the outermost layer 14 is directly exposed to the outside environment E; the innermost layer 16 is directly exposed to the exhaust system 12, and the intermediate layer 18 is sandwiched between the outermost and innermost layers 14, 16, and thus, it is not in direct contact with the environment E or exhaust system 12.

The outermost layer 14 is provided as a solid, impervious reflective layer, and thus, it acts to both reflect radiant heat of the exhaust gases radially inwardly from the outermost layer 14, thereby preventing the heat generated within the exhaust system 12 from escaping, and further, to prevent external environmental effects, such as external convection, from reducing the thermal gradient of the exhaust gases.

Further, with the outermost layer 14 being impervious, the outermost layer 14 prevents fluids in the outer environment E from penetrating the heat shield 10, thereby preventing the fluids from reaching the exhaust system 12 and reducing the temperature of the exhaust gases. By way of example, and without limitation, the outermost layer 14 can be provided as a sheet of reflective foil, such as aluminum foil or any other suitable wrappable metal sheet.

The innermost layer 16 is provided as a textile fabric formed of interlaced, high temperature yarn, such as via knitting, weaving, braiding, or as a nonwoven material having intertwined high temperature fibers, e.g. basalt, silica, or other high temperature fibers, and as such, can withstand extremely high temperatures, such as 650 degrees Centigrade (° C.) continuously, and about 750° C. intermittently. By way of example and without limitation, the inner layer 16 can be constructed having three integrally knit layers, also referred to as a tri-layer knit fabric, including a knit outer layer 20, a knit inner layer 22 and a knit middle layer 24. The middle layer 24 is sandwiched in abutment between the outer and inner layers 20, 22. The three layers 20, 22, 24 are constructed simultaneously in a single knitting operation, thereby providing economic benefits, including, by way of example, minimizing the number of operations, time, knitting machines and floor space. The outer layer 20 has yarns knit with one another via interlooped knit stitches to provide a self-sustaining knit layer, such that the outer layer 20 would not unravel if left to itself, the inner layer 22 has yarns knit with one another via interlooped knit stitches to provide a self-sustaining knit layer, such that the inner layer 22 would not unravel if left to itself, and the middle layer 24 has yarns knit via knit stitches looped about at least some of the yarns of the outer layer 20 and about at least some of the yarns of the inner layer 22, however, the middle layer 24 does not have knit stitches looped amongst itself. Accordingly, the inner layer 16 provides an integrally knit structure having three layers 20, 22, 24 knit stitched together in substantially uniform relation over its entire area such that the three layers 20, 22, 24 of the inner layer 16 are fixed to one another in inseparable fashion. As such, the knit inner layer 16, aside from providing an excellent protective and thermal barrier, has excellent resistance to separation and movement of the layers 20, 22, 24 relative to one another in tension and shear.

In manufacture, if knitted, the layers 20, 22, 24 of the innermost layer 16 are knit from any suitable size and type of multifilament and/or monofilament high temperature yarn, including denier and diameter. In addition, any suitable type of knit stitch and density of stitch can be used to construct the layers 20, 22, 24. Accordingly, depending on the functional properties desired, either the same or different types of yarn (e.g., monofilament, multifilament, denier, diameter, color, texture, thermal properties, abrasion resistance, physical properties) can be used to construct each of the layers 20, 22, 24, and the same or different types of knit stitches and stitch densities can be used to construct the outer and inner layers 20, 22, as desired. Accordingly, depending on the intended application, the innermost layer 16 can be customized to best meet the thermal properties desired.

The innermost layer 16, if knitted, is preferably knit using a double flatbed knitting machine (not shown), such as discussed in U.S. Pat. No. 8,434,333 (referred to as the '333 patent), which is assigned to a common assignee as the instant application, with the '333 patent being incorporated herein by reference in its entirety. While being knit on the double flatbed knitting machine, the outer layer 20 is knit on one bed of the machine and the inner layer 22 is knit on the opposite bed of the machine, wherein the beds converge toward one another. Meanwhile, the middle layer 24 is knit via both beds of the machine simultaneously with the outer and inner layers 20, 22. The outer layer 20 is knit having one selected knit stitch pattern from one yarn, while the inner layer 22 is knit having another knit stitch pattern using another, wherein the respective knit stitch patterns and types of yarn used to construct the outer and inner layers 20, 22 can be the same, or different, depending on the properties desired for the intended application. Accordingly, by way of example and without limitation, the outer and inner layers 20, 22 are constructed from a yarn having high temperature heat resistance, such as from multifilaments of basalt, silica, ceramic, stainless steel, and bi-component yarns wherein both components of the bi-component yarn are high temperature resistant materials, for example.

The middle layer 24 of the innermost layer 16, unlike the outer and inner layers 20, 22, is not constructed as a self-sustaining layer. As such, if the outer and inner layers 20, 22 were to be separated from the middle layer 24, the middle layer 24 would not remain as a self-sustaining knit construction, and thus, it would tend to unravel. This is because the yarns of the middle layer 24 are looped about selected yarns of the outer and inner layers 20, 22 using a tuck stitch, and thus, without the yarns of the outer and inner layers 20, 22, the middle layer 24 would come unraveled. As with the outer and inner layers 20, 22, the yarn used to form the middle layer 24 can be selected from any type (monofilament/multifilament), size (denier/diameter) and high temperature material of yarn desired, depending on the requirements of the exhaust application. Accordingly, by way of example and without limitation, the middle layer 24 can be formed from multifilaments of basalt, silica, ceramic, stainless steel, and bi-component yarns wherein both components of the bi-component yarn are high temperature resistant materials. Generally, aside from attaching the outer and inner layers 20, 22 together, the middle layer 24 acts as an additional insulation layer by forming intermediate air pockets between the outer and inner layers 20, 22, thereby providing an enhanced, effective barrier to conduction, convection and radiation.

The intermediate layer 18 is provided as a high temperature non-woven material, such as from a layer of fiberglass felt material having glass fibers bonded or locked to together, such as via needled, by way of example and without limitation, which can withstand high temperatures of about 550° C. continuously. It is contemplated that other types of high temperature fibers, including basalt, silica, ceramic, metal, or the like could be used in the construction of the non-woven intermediate layer 18. With the innermost layer 16 being able to withstand even higher temperatures, such as up to 650° C. continuously and 750° C. intermittently, as discussed above, and with the intermediate layer 18 being shielded by the innermost layer 16 from direct exposure to the exhaust system, the intermediate layer 18 is able to be formed with materials having a slightly lower temperature rating and reduced heat capacity relative to the innermost layer 16. This said, with the intermediate layer 18 being a non-woven material, formed of intertwined fibers, numerous micro-pores are formed therein, which act to trap air, and thus, provide an excellent source of insulation to keep heat from escaping. The thickness of the intermediate layer 18 can be adjusted, as desired, to arrive at the insulating "R" value desired for the intended application.

Accordingly, the heat shield 10 is composed of at least three different and separate layers 14, 16, 18 that, when fixed together with one another, have a synergy that allows the heat shield 10 to function as intended. Each of the outermost, innermost and intermediate layers 14, 16, 18 protects one another to allow each layer to function as intended, as discussed. The separate layers 14, 16, 18 of the heat shield 10 can be fixed to one another using a variety of mechanisms, including high temperature adhesives, sewing, and mechanical fasteners, by way of example and without limitation. Further, the heat shield 10 can be sized and shaped as desired, such as via die cutting, for example. It should be recognized that with the wall 13 being wrappable, the wall 13 has opposite edges 19, 21 that extend generally parallel with a longitudinal axis 23, such that the opposite edges are wrapped about the axis 13 and either brought into abutment with one another, or overlapped with one another, wherein any suitable fastener 25, such as a metal hose clamp or the like, by way of example and without limitation, can be used to fix the wall 13 of the heat shield 10 in its circumferentially wrapped configuration about the exhaust system 12.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A protective heat shield having a multilayered wrappable wall, comprising:
   a reflective radially outermost layer;
   a radially innermost tri-layer knit fabric including a knit innermost layer and a knit outer layer fixed to one another via a knit middle layer, said tri-layer knit fabric including high temperature yarn able to withstand temperatures above about 650 degrees Centigrade;
   an intermediate layer of non-woven material of intertwined fibers defining micro-pores, said intermediate layer being formed as a separate layer from said innermost tri-layer knit fabric and being subsequently fixed in sandwiched relation between, and in direct contact with, said outermost layer and said innermost tri-layer knit fabric; and
   wherein said knit high temperature yarn are selected from the group consisting of basalt, silica, ceramic, and stainless steel.

2. The protective heat shield of claim 1 wherein said outermost layer is impervious.

3. The protective heat shield of claim 2 wherein said outermost layer is metal.

4. The protective heat shield of claim 3 wherein said outermost layer is aluminum foil.

5. The protective heat shield of claim 1 wherein said intermediate layer is formed of high temperature fibers able to withstand temperatures above about 550 degrees Centigrade.

6. A protective heat shield having a multilayered wrappable wall, comprising:
   a reflective radially outermost layer;
   a radially innermost tri-layer knit fabric including a knit innermost layer and a knit outer layer fixed to one another via a knit middle layer, said tri-layer knit fabric including high temperature yarn able to withstand temperatures above about 650 degrees Centigrade; and
   an intermediate layer of non-woven material of intertwined fibers defining micro-pores, said intermediate layer being formed as a separate layer from said innermost tri-layer knit fabric and being subsequently fixed in sandwiched relation between, and in direct contact with, said outermost layer and said innermost tri-layer knit fabric;
   wherein said intermediate layer is formed of high temperature fibers able to withstand temperatures above about 550 degrees Centigrade and wherein said high temperature fibers are glass fibers bonded together.

7. A protective exhaust system heat shield having a multilayered wrappable wall, comprising:
   a reflective radially outermost layer of impervious metal foil;
   a radially innermost tri-layer knit fabric including a knit innermost layer and a knit outer layer fixed to one another via a knit middle layer, said tri-layer knit fabric including high temperature yarn able to withstand temperatures above about 650 degrees Centigrade selected from the group consisting of basalt, silica, ceramic, and stainless steel; and
   an intermediate layer of high temperature non-woven material formed as a separate layer from said innermost tri-layer knit fabric and being subsequently fixed in sandwiched relation between, and in direct contact with, said outermost layer of impervious foil and said innermost tri-layer knit fabric.

8. The protective exhaust system heat shield of claim 7 wherein said high temperature non-woven material is fiberglass.

9. The protective heat shield of claim 5 wherein said high temperature fibers are needled and locked together.

* * * * *